(12) United States Patent
Inatomi et al.

(10) Patent No.: US 8,248,043 B2
(45) Date of Patent: Aug. 21, 2012

(54) CONTROL CIRCUIT FOR DC-DC CONVERTER, CONTROL METHOD FOR DC-DC CONVERTER, AND ELECTRONIC DEVICE

(75) Inventors: Koichi Inatomi, Kasugai (JP); Naoki Nagase, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 371 days.

(21) Appl. No.: 12/617,253

(22) Filed: Nov. 12, 2009

(65) Prior Publication Data
US 2010/0127678 A1 May 27, 2010

(30) Foreign Application Priority Data
Nov. 27, 2008 (JP) ................................. 2008-302605

(51) Int. Cl.
*G05F 1/613* (2006.01)
(52) U.S. Cl. ....................................... 323/224; 323/266
(58) Field of Classification Search .................. 323/224, 323/266, 284
See application file for complete search history.

(56) References Cited

U.S. PATENT DOCUMENTS 7,106,031 B2 * 9/2006 Hayakawa et al. ........... 323/224
7,148,668 B1 * 12/2006 Collins ......................... 323/282
7,586,296 B2 * 9/2009 Kanayama .................... 323/282

FOREIGN PATENT DOCUMENTS
JP 2004-040858 A 2/2004
* cited by examiner

*Primary Examiner* — Shawn Riley
(74) *Attorney, Agent, or Firm* — Arent Fox LLP

(57) ABSTRACT

A control circuit for a DC-DC converter includes a controller configured to control, based on a feedback voltage, a first switch provided between an inductor and a reference potential and a second switch provided between a coupling node of the first switch and the inductor and an output terminal, a third switch provided between the second switch and the output terminal and turned off when an overcurrent flows in a coupling path between the second switch and the output terminal, and a selector configured to select a voltage of a first position which is located on a side of the second switch in the coupling path as the feedback voltage when the third switch is turned off, or a voltage of a second position which is located on a side of the output terminal in the coupling path as the feedback voltage when the third switch is turned on.

6 Claims, 5 Drawing Sheets

CONTROL CIRCUIT FOR DC-DC CONVERTER, CONTROL METHOD FOR DC-DC CONVERTER, AND ELECTRONIC DEVICE

CROSS-REFERENCE TO RELATED APPLICATION

This application is based upon and claims the benefit of priority of the prior Japanese Patent Application No. 2008-302605 filed on Nov. 27, 2008, the entire contents of which are incorporated herein by reference.

FIELD

The embodiments discussed herein are related to a control circuit for a direct current to direct current converter (DC-DC converter), a control method for the DC-DC converter, and an electronic device.

BACKGROUND

A typical portable electronic device, such as a digital camera, includes a DC-DC converter. The DC-DC converter raises or lowers an input voltage from, for example, a lithium ion battery or a dry battery, generates an output voltage at a desired voltage level, and supplies the output voltage as a power supply to an electronic component (load), such as a semiconductor device, in the electronic device.

To generate the desired output voltage by controlling "on" and "off" states of a switching element and raising or lowering the input voltage from the battery, the DC-DC converter includes, for example, an error amplifier and a comparator. The DC-DC converter causes the error amplifier and the comparator to determine whether the output voltage is maintained at the desired voltage level. Further, the DC-DC converter causes the error amplifier and the comparator to set the lengths of time during which the switching element may be in the "on" and "off" states and to control the "on" and "off" states of the switching element so that the output voltage may reach the desired voltage.

For example, Japanese Patent Application Laid-Open Publication No. 2004-040858 discusses a DC-DC converter including a short-circuit protection circuit for detecting a change in an output voltage and stopping the operation of the DC-DC converter when a load to which the output voltage is supplied is electrically disconnected from the DC-DC converter.

For example, the error amplifier and the comparator of the DC-DC converter operate using the input voltage from the battery provided in the electronic device. The output voltage is generated based on the input voltage. The input voltage is requested to be a given voltage, for example, 2.5 V or more so that the error amplifier and the comparator may operate as desired. The battery is increasingly discharged as the electronic device is used for a longer time. When the input voltage falls below the given voltage, the error amplifier and the comparator may not operate as desired. As a result, the DC-DC converter may neither generate the desired output voltage nor output the voltage to each load.

In a low voltage system using a dry battery, a nickel metal hydride (NiMH) battery, or the like, the lowest input voltage is 1.8 V, for example. As a DC-DC converter that may operate with such a low input voltage, a self power supplying DC-DC converter that raises an input voltage by itself and generates an operation power supply voltage not less than a given voltage, and supplies the generated operation power supply voltage to, for example, an error amplifier and a comparator is known.

FIG. 1 is a circuit diagram illustrating a typical self power supplying DC-DC converter 50. The DC-DC converter 50 includes an inductor L1, a smoothing capacitor C1, a first transistor Tr1, a second transistor Tr2, and a control circuit 51 for complementarily controlling the "on" and "off" states of the transistors Tr1 and Tr2.

When the transistor Tr1 is turned on and the transistor Tr2 is turned off in the DC-DC converter 50, the energy corresponding to an input voltage VIN (battery voltage) is stored in the inductor L1. When the transistor Tr1 is turned off and the transistor Tr2 is turned on, the energy stored in the inductor L1 is discharged to an output terminal Ta through the transistor Tr2 and smoothed by the smoothing capacitor C1. The voltage direction in the inductor L1 during the energy discharge is the same as the direction of the input voltage VIN (battery voltage). Therefore, an output voltage VO raised higher than the input voltage VIN is generated.

For example, the control circuit 51 includes an error amplifier 52 and a pulse width modulation (PWM) comparator 53 that receive the output voltage VO as an operation power supply voltage VCC. For example, the error amplifier 52 and the PWM comparator 53 generate a PMW signal SG1 based on the generated output voltage VO. The control circuit 51 controls the "on" and "off" states of the transistors Tr1 and Tr2 based on the PWM signal SG1 so that the output voltage VO may become a given target voltage.

Further, the control circuit 51 receives the generated output voltage VO as the operation power supply voltage VCC and a voltage comparator 54 included in the control circuit 51 compares the output voltage VO (operation power supply voltage VCC) with a given reference voltage Vk. When the voltage comparator 54 determines that the operation power supply voltage VCC is lower than the reference voltage Vk, which implies that, due to the discharge, the input voltage VIN (battery voltage) becomes so low that the error amplifier 52, the PWM comparator 53, and the like may not be operated as desired, the "on" and "off" states of the transistors Tr1 and Tr2 are controlled based on an oscillation pulse signal SP from a ring oscillator 55 and the output voltage VO is raised. Thus, even when the discharged amount of the battery increases and the battery voltage becomes lower than the reference voltage Vk, the DC-DC converter 50 may cause the error amplifier 52, the PWM comparator 53, and the like to operate as desired and may generate the desired output voltage VO.

However, when a load to which the output voltage VO is supplied is electrically disconnected from the DC-DC converter 50 for some reason, a typical protection circuit may not be provided and problems described below may occur.

When the load is electrically disconnected from the DC-DC converter 50 for some reason, the output voltage VO becomes lower and the voltage comparator 54 wrongly determines that the input voltage VIN (battery voltage) would no longer be high enough to operate the error amplifier 52, the PWM comparator 53, and the like as desired. As a result of the wrong determination, the "on" and "off" states of the transistors Tr1 and Tr2 are controlled based on the oscillation pulse signal SP from the ring oscillator 55 and the output voltage VO is raised. Thus, a current may continue to flow toward the load even though the load is electrically disconnected.

SUMMARY

According to an aspect of the embodiment, a control circuit for a DC-DC converter includes a controller configured to control, based on a feedback voltage, a first switch provided between an inductor and a reference potential and a second switch provided between a coupling node of the first switch and the inductor and an output terminal, a third switch provided between the second switch and the output terminal and turned off when an overcurrent flows in a coupling path between the second switch and the output terminal, and a selector configured to select a voltage of a first position which is located on a side of the second switch in the coupling path as the feedback voltage when the third switch is turned off, or a voltage of a second position which is located on a side of the output terminal in the coupling path as the feedback voltage when the third switch is turned on.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

An embodiment is described below with reference to FIGS. 2 and 3.

Figure 1:
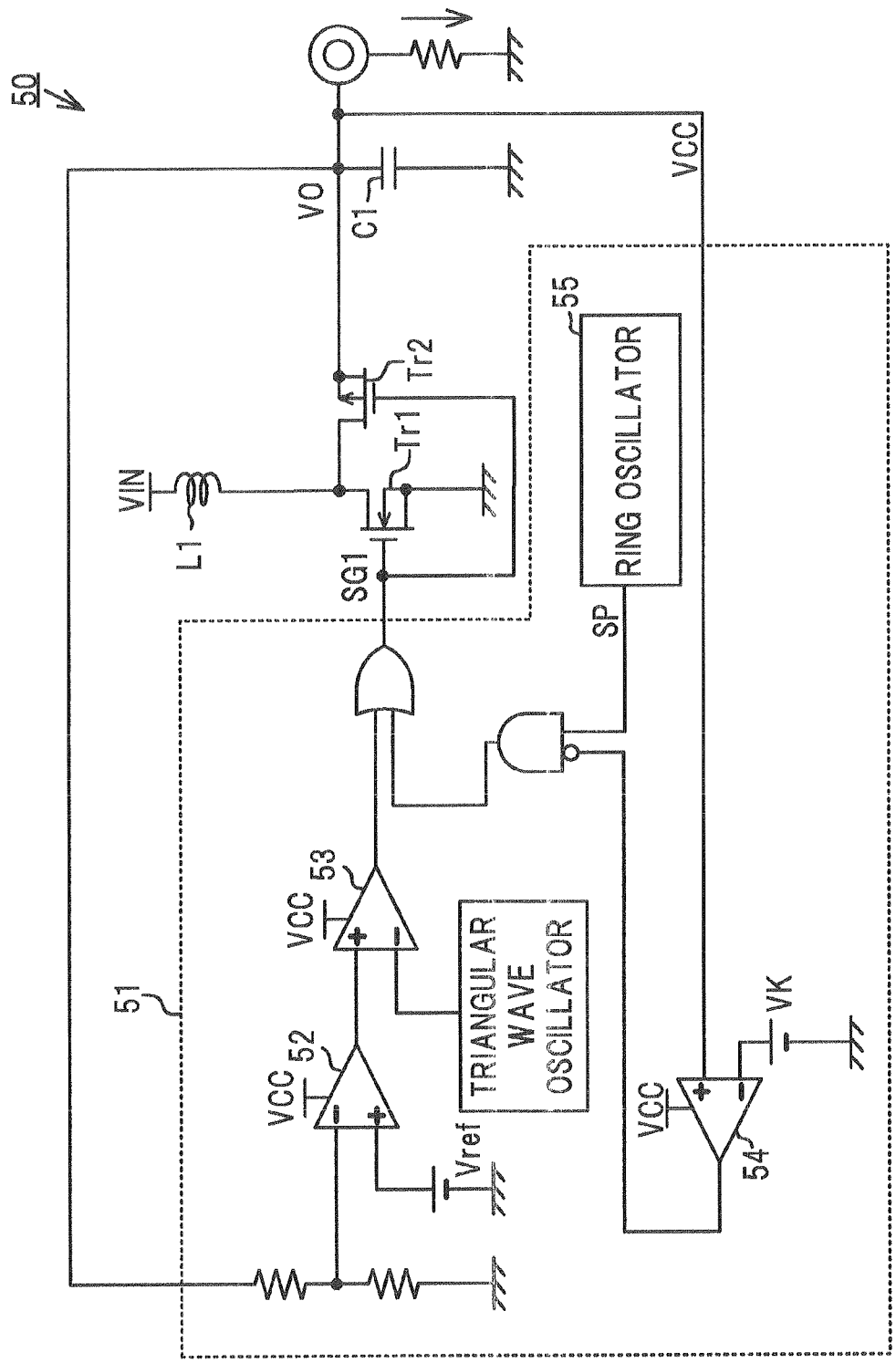
FIG. 1 illustrates a typical DC-DC converter.
Figure 2:
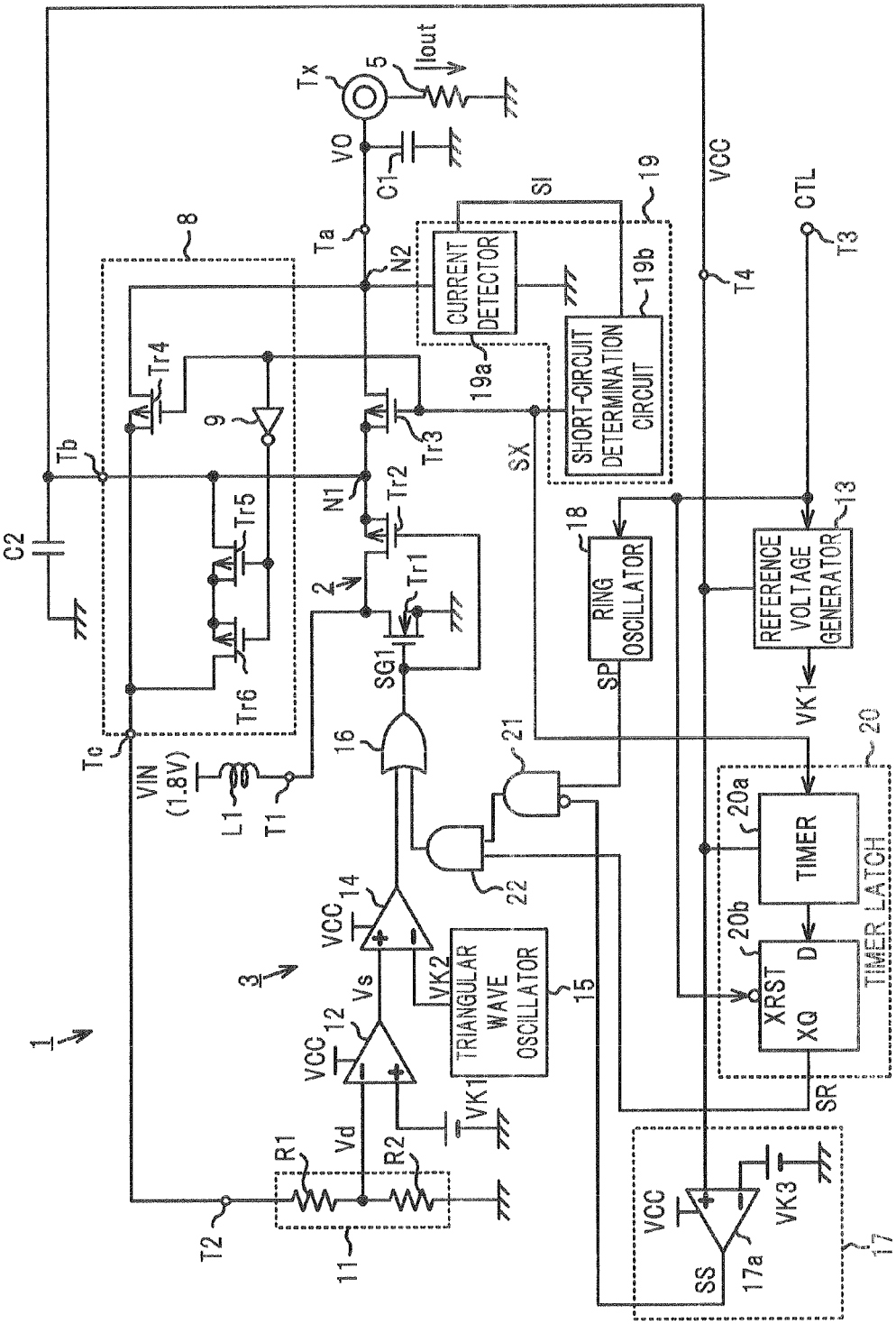
FIG. 2 illustrates an example of a DC-DC converter according to an embodiment.

A direct current to direct current converter (DC-DC converter) 1 in FIG. 2 is a self power supplying DC-DC converter and is included in an electronic device (in a digital camera for example). The DC-DC converter 1 includes a converter 2 and a controller 3.

The converter 2 includes a first transistor Tr1 functioning as a first switch, a second transistor Tr2 functioning as a second switch, a current cutting transistor Tr3 functioning as a third switch, an inductor L1, and a first smoothing capacitor C1.

The transistor Tr1 is an N-channel metal oxide semiconductor (NMOS) transistor. To the gate of the transistor Tr1, a pulse width modulation (PWM) signal SG1 output from the controller 3 is supplied. The source of the transistor Tr1 is coupled to the ground and the drain of the transistor Tr1 is coupled to the inductor L1 through a first input terminal T1. The first input terminal T1 receives an input voltage VIN of, for example, 1.8 V supplied from a battery in the digital camera through the inductor L1.

The transistor Tr2 is a P-channel metal oxide semiconductor (PMOS) transistor. To the gate of the transistor Tr2, the PWM signal SG1 output from the controller 3 is supplied. The drain of the transistor Tr2 is coupled to the drain of the transistor Tr1. The source of the transistor Tr2 is coupled to an output terminal Ta through the current cutting transistor Tr3. The output terminal Ta is coupled to the ground through the first smoothing capacitor C1 and coupled to a load 5, such as a central processing unit, through an external output terminal Tx. The back gate and the source of the transistor Tr2 are mutually coupled and a body diode is formed when the transistor Tr2 is turned off.

The current cutting transistor Tr3 is a PMOS transistor. To the gate of the transistor Tr3, a short-circuit determination signal SX output from a short-circuit determination circuit 19b of the controller 3 is supplied. The back gate and the drain of the current cutting transistor Tr3 are mutually coupled and a body diode is formed when the transistor Tr3 is turned off.

The transistors Tr1 and Tr2 are complementarily turned on or off based on the PWM signal SG1 from the controller 3. Accordingly, the input voltage VIN input from the first input terminal T1 is raised and supplied from the output terminal Ta (external output terminal Tx) to the load 5 as an output voltage VO. The output voltage VO is controlled to be a given target voltage of, for example, 5 V by changing a ratio of the lengths of time during which the transistor Tr1 is turned on and off ("duty ratio").

When the load 5 is electrically disconnected, the current cutting transistor Tr3 is turned off based on the short-circuit determination signal SX at the "H" level, which is output from the controller 3, and a load current Iout flowing to the load 5 through the transistor Tr2 and the output terminal Ta is cut off. Thus, the cutoff of the load current Iout is performed by turning off the current cutting transistor Tr3 and may prevent an overcurrent from flowing to the load 5 when the load 5 is electrically disconnected.

A first node N1 functioning as a first position or a second position between the transistor Tr2 and the current cutting transistor Tr3 is coupled to an operation power supply voltage output terminal Tb. The output terminal Tb is coupled to the ground through a second smoothing capacitor C2. When the transistors Tr1 and Tr2 are complementarily turned on or off based on the PWM signal SG1 from the controller 3, the input voltage VIN input through the first input terminal T1 is raised and output from the output terminal Tb to the second smoothing capacitor C2 as an operation power supply voltage VCC, which is a voltage lower than the output voltage VO by an amount of the voltage drop caused when the current cutting transistor Tr3 is turned on. The operation power supply voltage VCC is supplied to, for example, an error amplifier 12, a PWM comparator 14, and a voltage comparator 17a as an operation power supply.

The controller 3 includes a selector 8, a voltage division circuit 11, the error amplifier 12, a reference voltage generator 13, the PWM comparator 14, a triangular wave oscillator 15, and an OR circuit 16.

The selector 8 includes a first switching transistor Tr4, a second switching transistor Tr5, a third switching transistor Tr6, and an inverter circuit 9. The first switching transistor Tr4 functioning as a fourth switch is a PMOS transistor. To the gate of the transistor Tr4, the short-circuit determination signal SX output from the short-circuit determination circuit 19b of the controller 3 is supplied. The drain of the transistor Tr4 is coupled to a second node N2 functioning as a first position or a second position between the transistor Tr3 and the output terminal Ta. The source of the transistor Tr4 is coupled to a feedback output terminal Tc. The back gate and the source of the transistor Tr4 are mutually coupled and a body diode is formed when the transistor Tr4 is turned off.

The second switching transistor Tr5 functioning as a fifth switch is a PMOS transistor. To the gate of the transistor Tr5, the short-circuit determination signal SX is supplied through the inverter circuit 9. The drain of the transistor Tr5 is coupled to the first node N1. The source of the transistor Tr5 is coupled to the drain of the third switching transistor Tr6. The back gate and the source of the transistor Tr5 are mutually coupled and a body diode is formed when the transistor Tr5 is turned off.

The third switching transistor Tr6 also functioning as the fifth switch is a PMOS transistor. Also to the gate of the transistor Tr6, the short-circuit determination signal SX is supplied through the inverter circuit 9. The source of the transistor Tr6 is coupled to the feedback output terminal Tc. The back gate and the drain of the transistor Tr6 are mutually coupled and a body diode is formed when the transistor Tr6 is turned off.

The transistors Tr4, Tr5, and Tr6 are complementarily turned on or off based on the short-circuit determination signal SX from the short-circuit determination circuit 19b of the controller 3.

When the short-circuit determination signal SX is at the "L" level (when the load 5 is electrically coupled), the transistor Tr4 is turned on and the transistors Tr5 and Tr6 are both turned off, and the voltage of the second node N2 (the output voltage VO) is output as a feedback voltage to the voltage division circuit 11 of the controller 3 through the feedback output terminal Tc.

When the short-circuit determination signal SX is at the "H" level (when the load 5 is electrically disconnected), the transistors Tr5 and Tr6 are both turned on and the transistor Tr4 is turned off, the voltage of the first node N1 (the operation power supply voltage VCC) is output as the feedback voltage to the voltage division circuit 11 of the controller 3 through the feedback output terminal Tc.

The voltage division circuit 11 is a series circuit including a first resistor R1 and a second resistor R2. An end of the series circuit, which is on the side of the first resistor R1, is coupled to a second input terminal T2. The other end of the series circuit, which is on the side of the second resistor R2, is coupled to the ground. The second input terminal T2 is coupled to the feedback output terminal Tc of the selector 8 and coupled to either the first node N1 or the second node N2 through the selector 8. That is, either the voltage of the first node N1 (the operation power supply voltage VCC) or the voltage of the second node N2 (the output voltage VO) is applied to the voltage division circuit 11.

For example, to the voltage division circuit 11, the voltage of the second node N2 (the output voltage VO) is supplied as the feedback voltage when the load 5 is electrically coupled and operates as desired, and the voltage of the first node N1 (the operation power supply voltage VCC) is supplied as the feedback voltage when the load 5 is electrically disconnected. A divided voltage Vd divided by the resistors R1 and R2 in the voltage division circuit 11 is output to the error amplifier 12.

A combined resistance value of the resistors R1 and R2 is set to be a value much larger than an on-resistance value of the first switching transistor Tr4 and than a combined resistance value of on-resistance values of the second switching transistor Tr5 and the third switching transistor Tr6. Accordingly, a voltage drop caused by the on-resistance of the transistor Tr4 and a voltage drop caused by the combined resistance of the on-resistances of the transistors Tr5 and Tr6 exert little influence on the divided voltage Vd.

The divided voltage Vd is input to an inversion input terminal of the error amplifier 12. A first reference voltage Vk1 that is a target voltage is input to a non-inversion input terminal of the error amplifier 12. The first reference voltage Vk1 is a voltage that the reference voltage generator 13 generates in response to a control signal CTL at the "H" level. The control signal CTL is input from a third input terminal T3 in response to a power-on signal. The reference voltage generator 13 is set to generate the first reference voltage Vk1 having substantially the same voltage value as the voltage value of the divided voltage Vd that occurs when the output voltage VO obtains a desired value (the target voltage).

The error amplifier 12 compares the divided voltage Vd with the first reference voltage Vk1 and outputs an error voltage Vs to the PWM comparator 14. The error voltage Vs is obtained by amplifying a difference voltage between the divided voltage Vd and the first reference voltage Vk1.

The error voltage Vs is input to a non-inversion input terminal of the PWM comparator 14. A second reference voltage Vk2 having a triangular waveform is input from the triangular wave oscillator 15 to an inversion input terminal of the PWM comparator 14. The PWM comparator 14 compares the level of the error voltage Vs with the level of the second reference voltage Vk2. The PWM comparator 14 generates the PWM signal SG1 that reaches the "H" level when the level of the second reference voltage Vk2 exceeds the level of the error voltage Vs and reaches the "L" level when the level of the second reference voltage Vk2 is equal to or lower than the level of the error voltage Vs. The PWM comparator 14 outputs the generated PWM signal SG1 to the gates of the transistors Tr1 and Tr2 through the OR circuit 16.

When the output voltage VO becomes lower than the target voltage in a step-up operation in the DC-DC converter 1, the duty of the "H"-level PWM signal SG1 from the PWM comparator 14 becomes larger. As a result, the length of time during which the transistor Tr1 is turned on becomes larger and the length of time during which the transistor Tr2 is turned on becomes smaller. Consequently, the output voltage VO of the DC-DC converter 1 increases. When the output voltage VO becomes equal to or exceeds the target voltage, the duty of the "H"-level PWM signal SG1 from the PWM comparator 14 becomes smaller. As a result, the length of time during which the transistor Tr1 is turned on becomes smaller and the length of time during which the transistor Tr2 is turned on becomes larger. Consequently, the output voltage VO of the DC-DC converter 1 decreases.

Thus, the "on" and "off" states of the transistors Tr1 and Tr2 are controlled so that the divided voltage Vd and the first reference voltage Vk1 may have substantially the same voltage values, and the output voltage VO may be maintained at the target voltage based on the first reference voltage Vk1.

The controller 3 further includes a detector 17 for detecting the voltage output from the first node N1, a ring oscillator 18, an overcurrent detector 19, a timer latch 20, a first AND circuit 21, and a second AND circuit 22.

The detector 17 includes a voltage comparator 17a. A non-inversion input terminal of the voltage comparator 17a is coupled to the output terminal Tb through a fourth input terminal T4. The voltage of the first node N1 (the operation power supply voltage VCC) is input to the non-inversion input terminal of the voltage comparator 17a. A third reference voltage Vk3 set in advance is input to an inversion input terminal of the voltage comparator 17a. The value of the third reference voltage Vk3 is set based on tests or calculations conducted in advance to determine a smallest value of the voltage (an allowable voltage value) of the first node N1 (the operation power supply voltage VCC), which enables the error amplifier 12, the PWM comparator 14, the voltage comparator 17a, and the like to operate properly. The voltage of the first node N1 (the operation power supply voltage VCC) is supplied to the error amplifier 12, the PWM comparator 14, the voltage comparator 17a, and the like as the operation power supply.

The voltage comparator 17a compares the level of the operation power supply voltage VCC with the level of the third reference voltage Vk3. As illustrated in FIG. 3, the voltage comparator 17a generates a detection signal SS that reaches the "H" level when the level of the operation power supply voltage VCC is higher than the level of the third reference voltage Vk3, and reaches the "L" level when the level of the operation power supply voltage VCC is equal to or lower than the level of the third reference voltage Vk3. The detection signal SS generated by the voltage comparator 17a is inverted and output to the first AND circuit 21.

Figure 3:
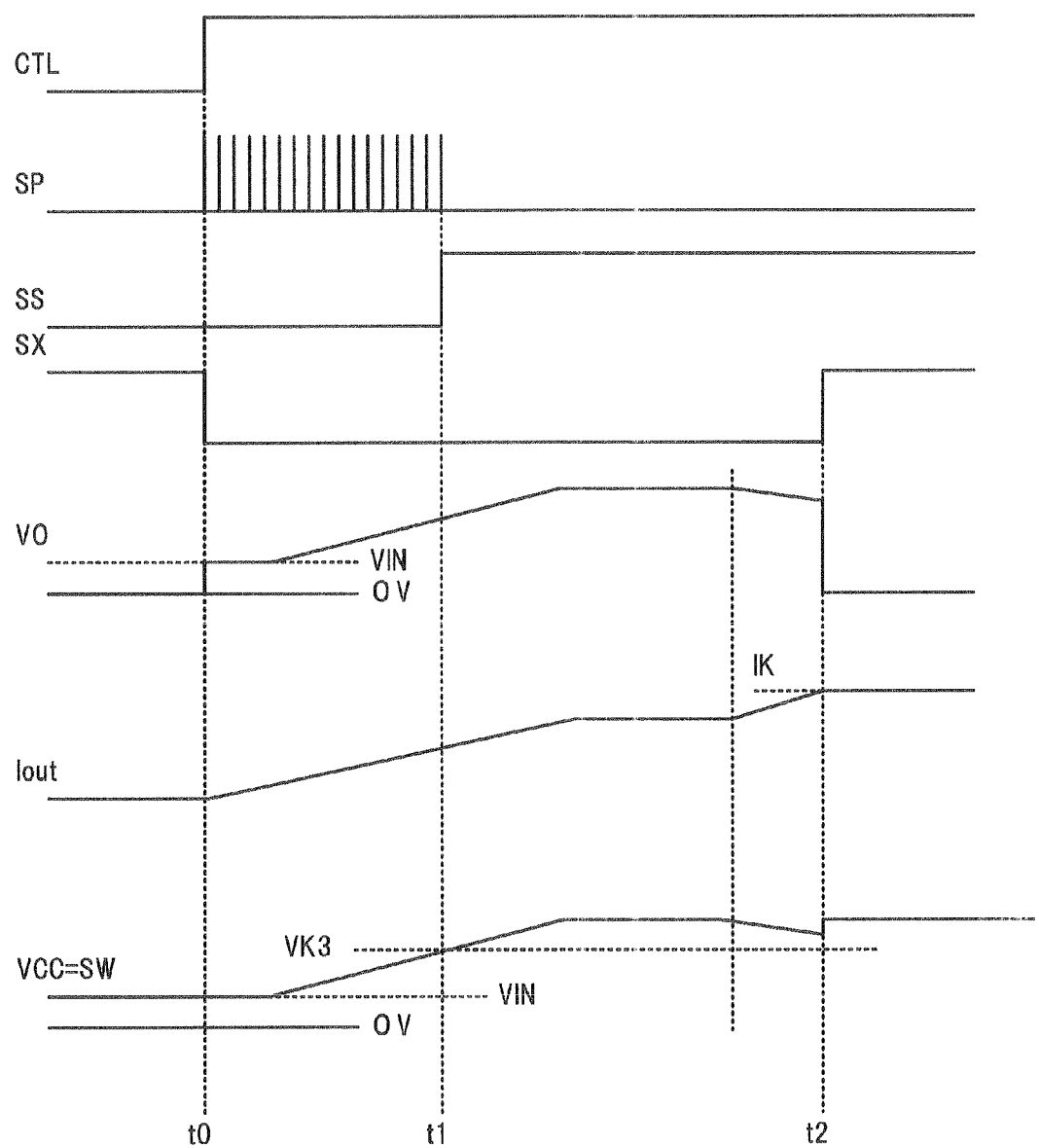
FIG. 3 is a waveform illustrating operations of the DC-DC converter in FIG. 2.

As further illustrated in FIG. 3, the ring oscillator 18 operates in response to the control signal CTL at the "H" level and generates an oscillation pulse signal SP having a given cycle. The oscillation pulse signal SP generated by the ring oscillator 18 is output to the first AND circuit 21.

The first AND circuit 21 receives an inverted signal of the detection signal SS generated by the voltage comparator 17a and the oscillation pulse signal SP generated by the ring oscillator 18. As further illustrated in FIG. 3, the first AND circuit 21 outputs the oscillation pulse signal SP from the output terminal of the first AND circuit 21 when the detection signal SS is at the "L" level. When the detection signal SS is at the "H" level, the first AND circuit 21 does not allow the oscillation pulse signal SP to be output from the output terminal of the first AND circuit 21. That is, the first AND circuit 21 outputs the oscillation pulse signal SP to the second AND circuit 22 when the level of the operation power supply voltage VCC is equal to or lower than the level of the third reference voltage Vk3, and does not output the oscillation pulse signal SP to the second AND circuit 22 when the level of the operation power supply voltage VCC is higher than the level of the third reference voltage Vk3.

The overcurrent detector 19 includes a current detector 19a and the short-circuit determination circuit 19b. The current detector 19a is coupled between the second node N2 and the ground and detects the load current Tout flowing to the load 5. The current detector 19a outputs a current detection signal SI to the short-circuit determination circuit 19b.

The short-circuit determination circuit 19b determines, based on the current detection signal SI, whether the load current Iout flowing to the load 5 is equal to or more than a given reference current Ik. The value of the reference current Ik is based on tests or calculations conducted in advance and is the value of the load current Iout (overcurrent) flowing from the external output terminal Tx to the load 5 when the load 5 is electrically disconnected.

When the load current Iout is equal to or more than the reference current Ik, the short-circuit determination circuit 19b determines that the load 5 is electrically disconnected and continues to output the short-circuit determination signal SX at the "H" level. The short-circuit determination signal SX at the "H" level is output to the gate of the current cutting transistor Tr3. The current cutting transistor Tr3 is turned off in response to the short-circuit determination signal SX at the "L" level and cuts off the first node N1 and the second node N2. As a result, the overcurrent (load current Tout) flowing to the load 5 is cut off.

Further, the short-circuit determination signal SX at the "H" level is output to the first to third switching transistors Tr4 to Tr6 in the selector 8. For example, the transistor Tr4 is changed from the "on" state to the "off" state in response to the short-circuit determination signal SX at the "H" level. As a result, the second node N2 and the voltage division circuit 11 are interrupted. The transistors Tr5 and Tr6 are changed from the "off" state to the "on" state in response to an inverted signal of the short-circuit determination signal SX at the "H" level, which is input through the inverter circuit 9. As a result, the first node N1 and the voltage division circuit 11 are coupled.

When the load 5 is electrically coupled and operates as desired, the short-circuit determination circuit 19b outputs the short-circuit determination signal SX at the "L" level and the selector 8 causes the voltage division circuit 11 to be coupled to the second node N2. Further, the selector 8 causes the voltage of the second node N2 (the output voltage VO) to be applied to the voltage division circuit 11 as the feedback voltage. When the load 5 is electrically disconnected, the short-circuit determination circuit 19b outputs the short-circuit determination signal SX at the "H" level and the selector 8 causes the voltage division circuit 11 to be coupled to the first node N1. Further, the selector 8 causes the voltage of the second node N1 (the operation power supply voltage VCC) to be applied to the voltage division circuit 11 as the feedback voltage.

Moreover, the short-circuit determination signal SX at the "H" level is output to the timer latch 20. The timer latch 20 includes a timer 20a and a latch 20b.

The timer 20a begins a timing operation in response to the short-circuit determination signal SX at the "H" level and, after a lapse of given time, outputs a time-up signal at the "H" level to a data input terminal D of the latch 20b. The latch 20b holds the time-up signal at the "H" level in response to the time-up signal at the "H" level, and inverts a latch signal SR output from an output terminal XQ of the latch 20b from the "H" level to the "L" level and holds the latch signal SR at the "L" level. That is, when the short-circuit determination circuit 19b determines that the load 5 is electrically disconnected, the timer latch 20 outputs the latch signal SR inverted from the "H" level to the "L" level to the second AND circuit 22 after a lapse of the given time. The latch 20b is reset based on the control signal CTL at the "H" level, which is output in response to the power-on signal, and inverts the latch signal SR output from the output terminal XQ of the latch 20b from the "L" level to the "H" level and holds the latch signal SR at the "H" level.

The second AND circuit 22 receives the latch signal SR from the latch 20b and receives the output signal from the first AND circuit 21 (the oscillation pulse signal SP). When the latch signal SR is at the "H" level, the second AND circuit 22 outputs the oscillation pulse signal SP. When the latch signal SR is at the "L" level, the second AND circuit 22 does not output the oscillation pulse signal SP.

That is, when the level of the operation power supply voltage VCC is equal to or lower than the level of the third reference voltage Vk3 and before the given time has elapsed, regardless of whether or not the load 5 is electrically coupled, the first AND circuit 21 and the second AND circuit 22 output the oscillation pulse signal SP of the ring oscillator 18 to the OR circuit 16.

When the level of the operation power supply voltage VCC is equal to or lower than the level of the third reference voltage Vk3 and after the given time has elapsed, or when the level of the operation power supply voltage VCC is higher than the level of the third reference voltage Vk3, the first AND circuit 21 and the second AND circuit 22 do not output the oscillation pulse signal SP of the ring oscillator 18 to the OR circuit 16.

Accordingly, when the level of the operation power supply voltage VCC is equal to or lower than the level of the third reference voltage Vk3 and before the given time has elapsed, regardless of whether or not the load 5 is electrically coupled, the oscillation pulse signal SP from the ring oscillator 18 is output to the gates of the transistors Tr1 and Tr2 through the OR circuit 16. As a result, the "on" and "off" states of the transistors Tr1 and Tr2 are controlled based on the oscillation pulse signal SP and the operation power supply voltage VCC is maintained at the allowable voltage value based on the third reference voltage Vk3.

Operations of the DC-DC converter 1 are described below with reference to FIG. 3. Before the power is turned on, the output voltage VO of the output terminal Ta is low (for example, approximately 0 V). The operation power supply voltage VCC of the operation power supply voltage output terminal Tb has substantially the same value as the value of the input voltage VIN applied from the first input terminal T1.

When the power is turned on at a time t0 and the control signal CTL at the "H" level is input from outside, the DC-DC converter 1 starts operating in response to the control signal CTL.

For example, the ring oscillator 18 oscillates in response to the control signal CTL and outputs the oscillation pulse signal SP to the first AND circuit 21. The latch 20b is reset and outputs the latch signal SR at the "H" level, which is output from the output terminal QX, to the second AND circuit 22.

Since the operation power supply voltage VCC of the output terminal Tb has the substantially the same value as the value of the input voltage VIN lower in value than the third reference voltage Vk3, the voltage comparator 17a outputs the detection signal SS at the "L" level. Based on the detection signal SS at the "L" level, the oscillation pulse signal SP generated by the ring oscillator 18 is output to the OR circuit 16 through the first AND circuit 21 and the second AND circuit 22.

The oscillation pulse signal SP that the OR circuit 16 receives is output to the gates of the transistors Tr1 and Tr2 and the output voltage VO is raised to the target voltage by controlling the "on" and "off" states of the transistors Tr1 and Tr2. Concurrently, the operation power supply voltage VCC is also raised.

When the operation power supply voltage VCC becomes higher than the third reference voltage Vk3 at a time t1, the voltage comparator 17a outputs the detection signal SS at the "H" level. After that, the oscillation pulse signal SP generated by the ring oscillator 18 is not output.

The short-circuit determination circuit 19b determines based on the current detection signal SI from the current detector 19a that the load 5 is electrically coupled, and outputs the short-circuit determination signal SX at the "L" level. Accordingly, the transistors Tr3 and Tr4 are turned on and the transistors Tr5 and Tr6 are turned off. The output voltage VO is supplied from the second node N2 to the voltage division circuit 11 as the feedback voltage.

When the oscillation pulse signal SP is not output to the OR circuit 16, the "on" and "off" states of the transistors Tr1 and Tr2 are controlled based on the PWM signal SG1 generated by, for example, the voltage division circuit 11, the error amplifier 12, the reference voltage generator 13, or the PWM comparator 14, or the combinations thereof, and the output voltage VO is controlled to be maintained at the target voltage.

When the load 5 becomes electrically disconnected at a time t2 and the short-circuit determination circuit 19b outputs the short-circuit determination signal SX at the "H" level based on the current detection signal SI from the current detector 19a, the transistor Tr3 is turned off. As a result, the load current Tout flowing to the load 5 is cut off.

Concurrently, the transistor Tr4 is changed from the "on" state to the "off" state and each of the transistors Tr5 and Tr6 is changed from the "off" state to the "on" state. The voltage of the first node N1 (the operation power supply voltage VCC) is supplied to the voltage division circuit 11 as the feedback voltage. Accordingly, based on the voltage of the first node N1 (the operation power supply voltage VCC), the PWM signal SG1 is generated by, for example, the voltage division circuit 11, the error amplifier 12, the reference voltage generator 13, or the PWM comparator 14, or the combinations thereof. In accordance with the PWM signal SG1 generated based on the voltage of the first node N1 (the operation power supply voltage VCC), the voltage of the first node N1 is controlled to have substantially the same value as the value of the output voltage VO that is a little higher than the operation power supply voltage VCC.

When the latch signal SR at the "L" level is output from the latch 20b, a step-up operation based on the oscillation pulse signal SP generated by the ring oscillator 18 may not be performed even when the voltage of the first node N1 (the operation power supply voltage VCC) becomes lower than the third reference voltage Vk3.

Since the DC-DC converter 1 continues to generate the voltage, which is controlled to be the target voltage, for the first node N1 even when the supply of the output voltage VO to the load 5 is interrupted, the voltage of the first node N1 (the operation power supply voltage VCC) is raised to be a high voltage and damages to the error amplifier 12, the reference voltage generator 13, the PWM comparator 14, and the like may be reduced if not prevented.

Thus, according to the embodiment, the advances described below may be obtained. In the embodiment, the current cutting transistor Tr3 is provided between the transistor Tr2 and the output terminal Ta and when the load 5 is electrically disconnected and the overcurrent is caused, the overcurrent may be cut off by turning off the current cutting transistor Tr3, That is, when the load 5 is electrically disconnected, an abnormal supply of the power to the load 5 may be stopped and the load 5 may operate as desired.

According to the embodiment, when the overcurrent is cut off by turning off the current cutting transistor Tr3, the voltage of the first node N1 is output to the voltage division circuit 11 as the feedback voltage. Therefore, generation of a voltage controlled to be the target voltage may be maintained for the first node N1. In such a case, since the voltage of the first node N1 (the operation power supply voltage VCC) is not raised to be a high voltage and is controlled to be the target voltage, damages to the error amplifier 12, the reference voltage generator 13, the PWM comparator 14, and the like may be reduced if not prevented.

Figure 4:
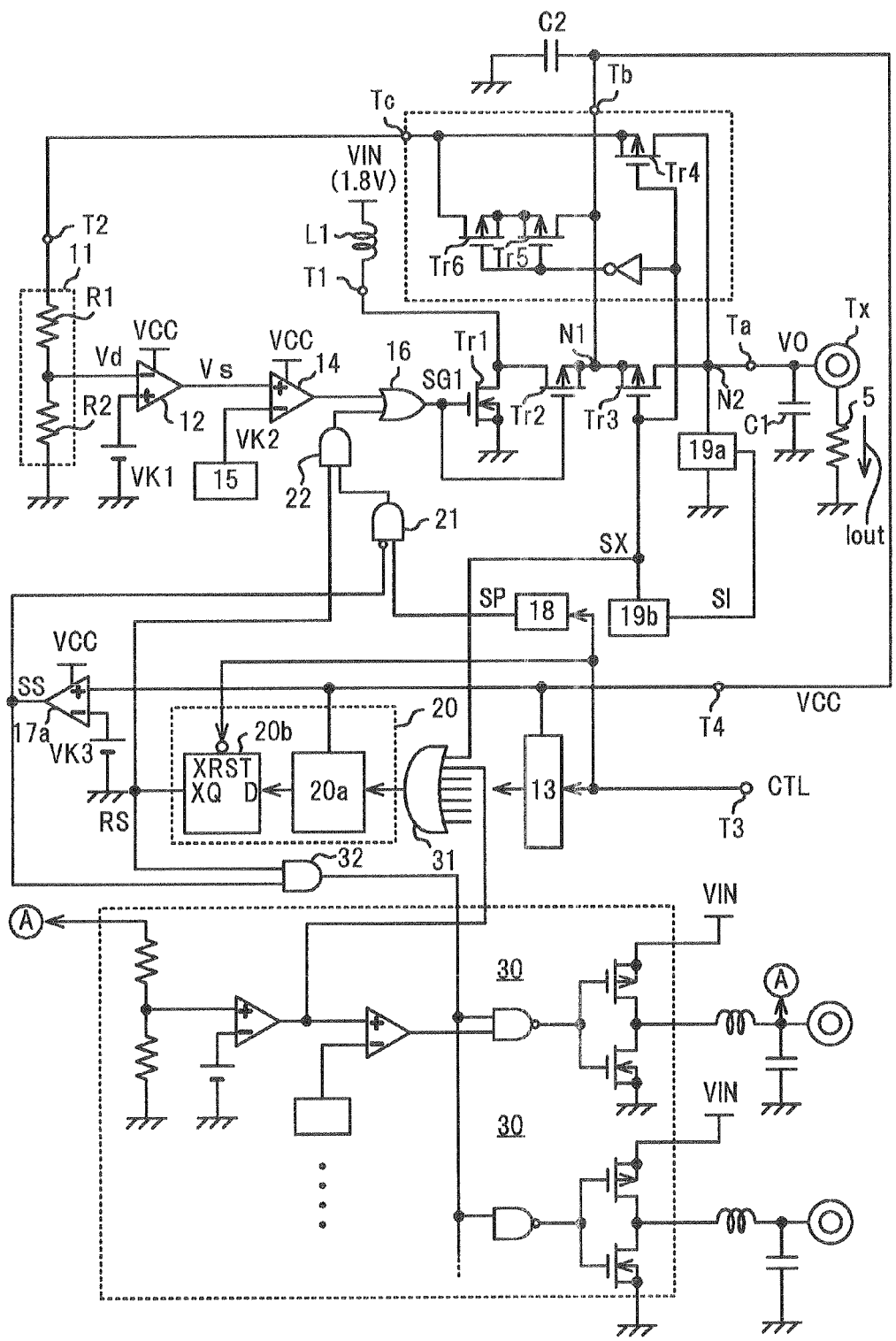
FIG. 4 illustrates another example of the DC-DC converter according to the embodiment.

The embodiment may be modified as described below. In the embodiment, a single DC-DC converter (the DC-DC converter 1) is described. However, as illustrated in FIG. 4, the DC-DC converter 1 may be combined with two or more DC-DC converters 30. The DC-DC converters 30 receive the input voltage VIN in common and each of the DC-DC converters 30 generates an output voltage having a value corresponding to a respective load. When the load 5 of the DC-DC converter 1 is electrically disconnected or when any one of the loads of the DC-DC converters 30 is electrically disconnected, an OR circuit 31 in the DC-DC converter 1 detects the electrical disconnection state of the load and provides the detected result to the timer latch 20. Further, the DC-DC converter 1 may cause an AND circuit 32 to output the latch signal RS and the detection signal SS to each of the DC-DC converters 30 so that the output voltages from the DC-DC converters 30 may not be supplied to the loads.

Figure 5:
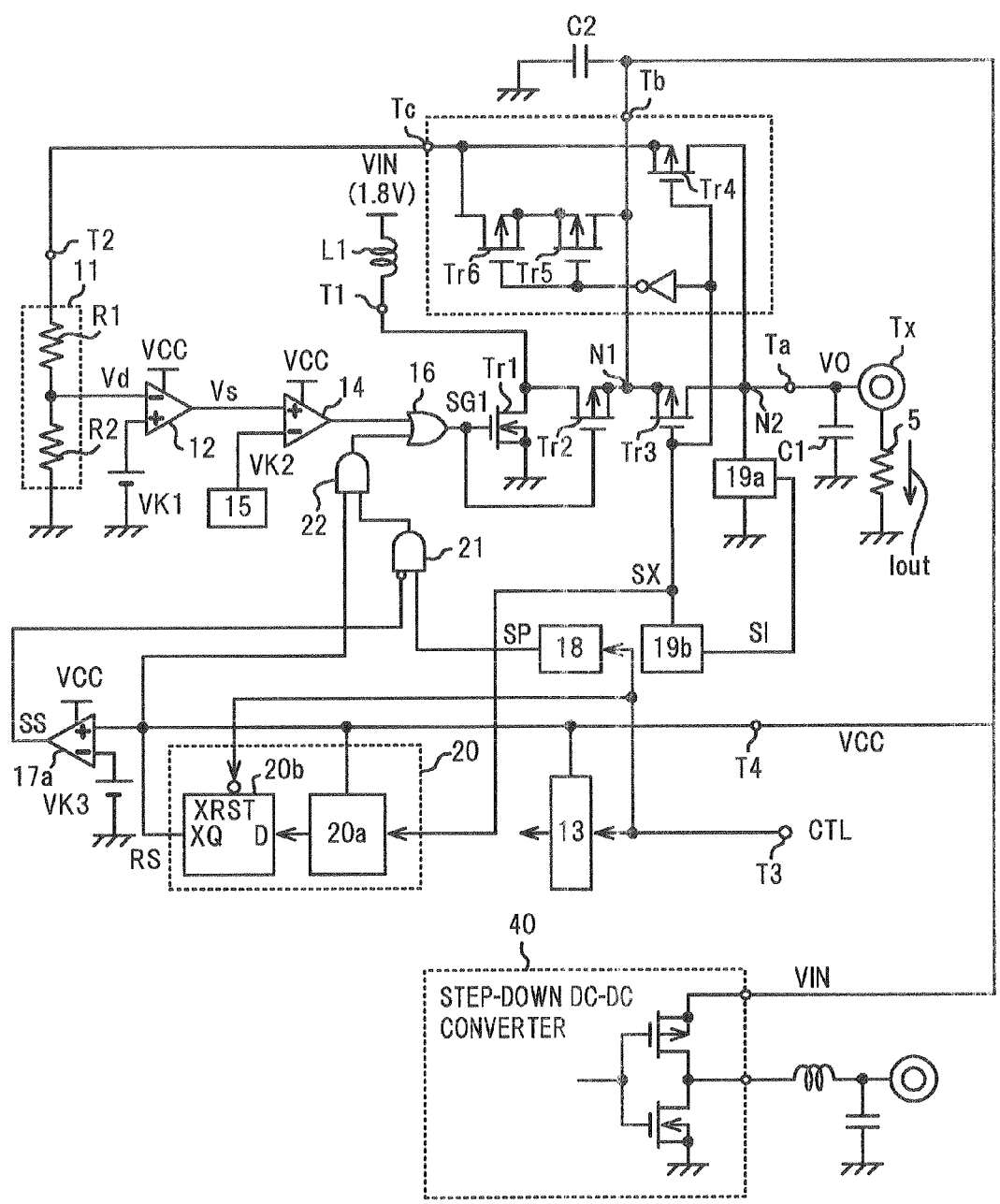
FIG. 5 illustrates another example of the DC-DC converter according to the embodiment.

As illustrated in FIG. 5, the DC-DC converter 1 according to the embodiment may be combined with a step-down DC-DC converter 40. The voltage of the first node N1 (the operation power supply voltage VCC) of the DC-DC converter 1 may be input as an input voltage VIN of the step-down DC-DC converter 40 and the step-down DC-DC converter 40 may generate an output voltage by lowering the input voltage VIN and output the generated output voltage to a load. In such a case, even when the load 5 of the DC-DC converter 1 is electrically disconnected, the step-down DC-DC converter 40 receives the voltage of the first node N1 (the operation power supply voltage VCC) as the input voltage VIN and the DC-DC converter 1 may continue to operate.

In the embodiment, the current detector 19*a* detects the load current Iout flowing to the load 5 and the short-circuit determination circuit 19*b* determines that the load 5 is electrically disconnected. The electrical disconnection of the load 5 may be determined also by monitoring the voltage value of the output voltage VO and detecting that the output voltage VO becomes lower due to the overcurrent caused by the electrical disconnection of the load 5.

In the embodiment, a self power supplying DC-DC converter (the DC-DC converter 1) is described. However, the DC-DC converter 1 may be a DC-DC converter other than a self power supplying DC-DC converter. In the embodiment, two transistors (the second switching transistor Tr5 and the third switching transistor Tr6) that function as the fifth switch are coupled between the first node N1 and the feedback output terminal Tc. However, the fifth switch may be implemented by a single transistor.

In the embodiment, the DC-DC converter 1 if; used for a digital camera. However, the DC-DC converter 1 may be used for another electronic device, such as a mobile telephone, a laptop computer, a personal navigation device, or a media player.

According to the embodiment, the overcurrent caused by the electrical disconnection of the load may be cut off by turning off the third switch. Further, even after the cutoff, the voltage of the first position may be compared with the reference voltage as the feedback voltage instead of the voltage of the second position and the output voltage may be generated.

According to the embodiment, when the load is electrically coupled and the third switch is turned on, the fourth switch is turned on and the voltage of the second position is output to the control circuit part as the feedback voltage. When the load is electrically disconnected and the third switch is turned off, the fifth switch is turned on and the voltage of the first position is output as the feedback voltage. According to the embodiment, the voltage of the first position is output to the control circuit part as the operation power supply voltage even when the load is electrically disconnected and the supply of the power to the load is stopped.

According to the embodiment, the overcurrent caused by the electrical disconnection of the load may be cut off. Further, even after the cutoff, the voltage of the second position may be compared with the reference voltage as the feedback voltage instead of the voltage of the first position and the output voltage may be generated.

Thus, according to the embodiment, the overcurrent caused by electrical disconnection may be cut off and the output voltage may be generated even after the cutoff.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A control circuit for a DC-DC converter, comprising:
   a controller configured to control, based on a feedback voltage, a first switch provided between an inductor and a reference potential and a second switch provided between a coupling node of the first switch and the inductor and an output terminal;
   a third switch provided between the second switch and the output terminal and turned off when an overcurrent flows in a coupling path between the second switch and the output terminal; and
   a selector configured to select a voltage of a first position which is located on a side of the second switch in the coupling path as the feedback voltage when the third switch is turned off, or a voltage of a second position which is located on a side of the output terminal in the coupling path as the feedback voltage when the third switch is turned on.

2. The control circuit for the DC-DC converter according to claim 1, wherein the selector comprises: a fourth switch coupled to the second position, turned on when the third switch is turned on, and allowing the voltage of the second position to be output as the feedback voltage; and a fifth switch coupled to the first position, turned on when the third switch is turned off, and allowing the voltage of the first position to be output as the feedback voltage.

3. The control circuit for the DC-DC converter according to claim 1, wherein the voltage of the first position is output to the controller as an operation power supply voltage.

4. A control method for a DC-DC converter, comprising:
   controlling, based on a feedback voltage, a first switch provided between an inductor and a reference potential, and a second switch provided between a coupling node of the first switch and the inductor and an output terminal;
   turning off a third switch provided between the second switch and the output terminal when an overcurrent flows in a coupling path between the second switch and the output terminal; and
   selecting a voltage of a first position which is located on a side of the second switch in the coupling path as the feedback voltage when the third switch is turned off, or a voltage of a second position which is located on a side of the output terminal in the coupling path as the feedback voltage for controlling when the third switch is turned on.

5. A control method for a DC-DC converter, comprising:
   controlling a current supplied to a first position coupled to a load and a second position coupled to a first position based on a first output voltage output from the first position;
   monitoring the current;
   electrically disconnecting the first position and the second position and stopping a supply of the current to the first position to control the supply of the current based on a second output voltage output from the second position when the current has a value not less than a reference value; and electrically connecting the first position and the second position to control the supply of the current based on a first output voltage output from the first position.

6. An electronic device comprising:

a controller configured to control, based on a feedback voltage, a first switch provided between an inductor and a reference potential and a second switch provided between a coupling node of the first switch and the inductor and an output terminal;

a third switch provided between the second switch and the output terminal and turned off when an overcurrent flows in a coupling path between the second switch and the output terminal; and a selector configured to select a voltage of a first position located on a side of the second switch in the coupling path as the feedback voltage when the third switch is turned off, or a voltage of a second position located on a side of the output terminal in the coupling path as the feedback voltage when the third switch is turned on.

* * * * *